United States Patent
Zhang

(10) Patent No.: US 11,632,217 B2
(45) Date of Patent: *Apr. 18, 2023

(54) METHOD AND DEVICE FOR GRANT-FREE TRANSMISSION IN UE AND BASE STATION FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 49 days.

This patent is subject to a terminal disclaimer.

(21) Appl. No.: 17/244,966

(22) Filed: Apr. 30, 2021

(65) Prior Publication Data

US 2021/0250151 A1    Aug. 12, 2021

Related U.S. Application Data

(63) Continuation of application No. 16/524,181, filed on Jul. 29, 2019, now Pat. No. 11,032,050, which is a
(Continued)

(30) Foreign Application Priority Data

Jan. 31, 2017    (CN) .......................... 201710062143.9

(51) Int. Cl.
*H04L 5/00* (2006.01)
*H04W 56/00* (2009.01)
(Continued)

(52) U.S. Cl.
CPC .......... *H04L 5/0053* (2013.01); *H04L 5/0094* (2013.01); *H04W 56/005* (2013.01);
(Continued)

(58) Field of Classification Search
CPC .. H04L 5/0053; H04L 5/0094; H04W 56/005; H04W 88/023; H04W 88/08; H04W 92/10
See application file for complete search history.

(56) References Cited

U.S. PATENT DOCUMENTS 11,032,050 B2 * 6/2021 Zhang .................... H04W 72/12
2011/0051621 A1 * 3/2011 Kwak .................... H04L 1/1861
375/135
(Continued)

FOREIGN PATENT DOCUMENTS

CN    103580797 A    2/2014
CN    104902560 A    9/2015
(Continued)

OTHER PUBLICATIONS

CN201710062143.9 Notification to Grant Patent Right for Invention dated Jul. 30, 2020.
(Continued)

*Primary Examiner* — Jael M Ulysse

(57) ABSTRACT

The disclosure provides a method and a device in a User Equipment (UE) and a base station for wireless communication. The UE first transmits a first radio signal, and then transmits a second radio signal; wherein the first radio signal includes M1 first radio sub-signal(s), and a first sequence is used for generating the first radio sub-signal; the second radio signal includes M2 second radio sub-signal(s), and a first bit block is used for generating the second radio sub-signal; the M1 is a positive integer, the M2 is a positive integer in a target set, and each element in the target set is a positive integer; and the target set is correlated with at least one of the M1 or the first sequence. The disclosure can save overheads caused by control information and improve spectrum efficiency of uplink transmission.

20 Claims, 10 Drawing Sheets

Related U.S. Application Data continuation of application No. PCT/CN2018/074399, filed on Jan. 29, 2018.

(51) Int. Cl.
  *H04W 88/02* (2009.01)
  *H04W 88/08* (2009.01)
  *H04W 92/10* (2009.01)

(52) U.S. Cl.
  CPC ......... *H04W 88/023* (2013.01); *H04W 88/08* (2013.01); *H04W 92/10* (2013.01)

(56) References Cited

U.S. PATENT DOCUMENTS

| | | | |
|---|---|---|---|
| 2011/0173508 A1* | 7/2011 | Wehinger | H04L 25/067 375/232 |
| 2011/0182377 A1* | 7/2011 | Fujii | H04L 5/0066 375/267 |
| 2012/0155412 A1* | 6/2012 | Kawamura | H04J 13/0074 375/147 |
| 2012/0177096 A1* | 7/2012 | Yano | H04L 1/0071 375/224 |
| 2013/0003672 A1* | 1/2013 | Dinan | H04L 27/2601 370/329 |
| 2015/0016395 A1* | 1/2015 | Papasakellariou | H04J 13/0048 370/329 |
| 2015/0103796 A1* | 4/2015 | Chung | H04L 25/0226 370/329 |
| 2015/0139348 A1* | 5/2015 | Tong | H04B 1/0053 375/267 |
| 2015/0222402 A1* | 8/2015 | Ouchi | H04W 72/0446 370/329 |
| 2016/0044646 A1* | 2/2016 | Seyama | H04L 25/0224 370/330 |
| 2016/0056984 A1* | 2/2016 | Liberg | H04L 27/14 375/322 |

FOREIGN PATENT DOCUMENTS

| | | |
|---|---|---|
| CN | 105376009 A | 3/2016 |
| WO | 2016047904 A1 | 3/2016 |
| WO | 2017000145 A1 | 1/2017 |

OTHER PUBLICATIONS

CN201710062143.9 1st Office Action dated Mar. 16, 2020.
CN201710062143.9 First Search Report dated Mar. 2, 2020.
ISR received in application No. PCT/CN2018/074399 dated Apr. 17, 2018.
Lenovo PUCCH format adapation and resource allocation for HARQ-ACK transmission 3GPP TSG RAN WG1 Meeting#82bis Nov. 22, 2015.

\* cited by examiner

| Ml | Target Set |
|---|---|
| 1 | 1, 2 |
| 4 | 2, 8 |
| 16 | 8, 32 |

METHOD AND DEVICE FOR GRANT-FREE TRANSMISSION IN UE AND BASE STATION FOR WIRELESS COMMUNICATION

CROSS-REFERENCE TO RELATED APPLICATION

This application is a continuation of the U.S. patent Ser. No. 16/524,181, filed Jul. 29, 2019, which is a continuation of International Application No. PCT/CN2018/074399, filed Jan. 29, 2018, claiming the priority benefit of Chinese Patent Application Serial Number 201710062143.9, filed on Jan. 31, 2017, the full disclosure of which is incorporated herein by reference.

BACKGROUND

Technical Field

The disclosure relates to transmission methods and devices in wireless communication systems, and in particular to a grant-free transmission scheme and device.

Related Art

In existing Long Term Evolution (LTE) systems, dynamic scheduling of uplink data is accomplished based on an uplink grant. Downlink Control Information (DCI) corresponding to an uplink grant includes a resource block assignment field which dynamically indicates at least one of frequency-domain resources or time-domain resources occupied by uplink data.

In future mobile communication systems, in order to save overheads of control signalings and reduce scheduling latency, grant-free uplink data transmission will be employed, and corresponding resource allocation approaches also need to be designed again. In grant-free uplink transmission, one simple implementation approach is that each UE occupies time-frequency resources of a same size when transmitting data. Although this approach reduces the complexity of reception of a base station, for a User Equipment (UE), one time of uplink transmission can transmit a fixed number of bits only, which reduces flexibility of uplink transmission.

SUMMARY

In view of the above problems, the disclosure provides a solution. It should be noted that the embodiments of the disclosure and the characteristics in the embodiments may be mutually combined arbitrarily if no conflict is incurred. For example, the embodiments of the UE of the disclosure and the characteristics in the embodiments may be applied to the base station, and vice versa.

The disclosure provides a method in a UE for wireless communication, wherein the method includes:
transmitting a first radio signal; and
transmitting a second radio signal.

Herein, the first radio signal includes M1 first radio sub-signal(s), and a first sequence is used for generating the first radio sub-signal; the second radio signal includes M2 second radio sub-signal(s), and a first bit block is used for generating the second radio sub-signal; the M1 is a positive integer, the M2 is a positive integer in a target set, and each element in the target set is a positive integer; and the target set is correlated with at least one of the M1 or the first sequence.

In one embodiment, in the above method, the target set is implicitly configured, which saves uplink control information.

In one embodiment, the M1 and the target set are both related to a quality of a channel from the UE to a receiver of the first radio signal; therefore, the M1 and the target set can be associated.

In one embodiment, the first sequence is a pseudorandom sequence.

In one embodiment, the first sequence is a Zadoff-Chu sequence.

In one embodiment, the first sequence includes a Cyclic Prefix (CP).

In one embodiment, the first radio signal is transmitted on a Physical Random Access Channel (PRACH).

In one embodiment, the target set is composed of one element (that is, the M2).

In one embodiment, the target set is composed of multiple elements.

In one embodiment, a receiver of the second radio signal determines the M2 from the target set through a blind detection.

In one embodiment, the target set is correlated with the M1, and the first sequence is used for determining an index of the M2 in the target set.

In one subembodiment, an index of the first sequence in a candidate sequence set is equal to an index of the M2 in the target set; and the candidate sequence set includes multiple candidate sequences.

In one embodiment, a length of the candidate sequence is related to a number of Resource Elements (REs) occupied by the first radio signal.

In one embodiment, all candidate sequences in the candidate sequence set have a same length (that is, a number of elements).

In one embodiment, the first bit block is transmitted from a higher layer of the UE to a physical layer of the UE.

In one embodiment, the higher layer is a Media Access Control (MAC) layer.

In one embodiment, the higher layer is a Radio Link Control (RLC) layer.

In one embodiment, the M1 is a positive integer number power of 2, or 1.

In one embodiment, the M2 is a positive integer number power of 2, or 1.

In one embodiment, the first bit block is one Transmission Block (TB).

In one embodiment, the first bit block is transmitted on an Uplink Shared Channel (UL-SCH).

In one embodiment, the second radio signal is transmitted on a Physical Uplink Shared Channel (PUSCH).

In one embodiment, the second radio signal is an output after the first bit block is processed in sequence through channel coding, modulation mapper, layer mapper, precoding, resource element mapper, and generation of Orthogonal Frequency Division Multiplexing (OFDM) signals.

In one embodiment, the channel coding includes rate matching.

In one embodiment, the transmission of the first radio signal is grant-free.

In one embodiment, the transmission of the first radio signal is contention-based.

In one embodiment, the transmission of the second radio signal is grant-free.

In one embodiment, the transmission of the second radio signal is contention-based.

According to one aspect of the disclosure, the above method further includes:

receiving a third radio signal.

Herein, the third radio signal is used for at least one of determining whether the first bit block needs to be retransmitted, adjusting a transmission timing of the UE or allocating resources for uplink transmission to the UE; M3 is used for determining at least one of a starting time of time-domain resources occupied by the third radio signal or time-domain resources occupied by the third radio signal; and the M3 is one element in the target set.

In one embodiment, in the above aspect, the target set is used for determining time-domain resources occupied by the third radio signal. The above aspect saves transmission of uplink control information.

In one embodiment, the M3 is a maximum value in the target set.

The above embodiment avoids an uncertainty of the starting time of the third radio signal due to multiple elements in the target set.

In one embodiment, the M3 is a minimum value in the target set.

The above embodiment avoids an uncertainty of the starting time of the third radio signal due to multiple elements in the target set, and meanwhile can support early decoding.

In one subembodiment, an ending time of time-domain resources occupied by the third radio signal is related to a maximum value in the target set.

In one embodiment, a position of the M3 in the target set is determined.

In one embodiment, the M3 is the M2.

In one subembodiment, the M3 is used for determining a starting time of time-domain resources occupied by the third radio signal.

In one embodiment, a first time window occupied by the third radio signal is a Kth time window after a reference time window, and the K is a positive integer. The reference time window is a last time window occupied by an M3th second radio sub-signal in the second radio signal. The K is a positive integer.

In one subembodiment, the K is correlated with the M3.

In one subembodiment, the K is correlated with the M1.

In one subembodiment, the time window has a duration less than 1 ms.

In one subembodiment, the time window is a subframe.

In one subembodiment, the time window includes a positive integer number of OFDM symbols.

In one embodiment, the third radio signal is transmitted on a physical layer control channel (that is, a physical layer channel capable of carrying physical layer control information only).

In one subembodiment, the third radio signal includes a DCI.

In one embodiment, the third radio signal is transmitted on a physical layer data channel (that is, a physical layer channel capable of carrying physical layer data).

In one subembodiment, the third radio signal includes a Random Access Response (RAR).

According to one aspect of the disclosure, the above method further includes:

receiving a first signaling.

Herein, the first signaling is used for determining a first-type time-frequency resource set; the first-type time-frequency resource set includes P1 first-type resource subset(s); the first radio signal occupies one first-type resource subset; the P1 is a positive integer; the first-type resource subset occupied by the first radio signal is used for determining at least one of air-interface resources occupied by the second radio signal or the M1; and the air-interface resources include at least the former one of time-frequency resources or code-domain resources.

In one embodiment, the above aspect saves control information for resource allocation of the second radio signal, and improves efficiency of transmission.

In one embodiment, the first-type resource subset includes a positive integer number of Physical Resource Blocks (PRBs).

In one embodiment, the first signaling is a physical layer signaling.

In one embodiment, the first signaling is a higher-layer signaling.

In one embodiment, the first signaling is a Radio Resource Control (RRC) layer signaling.

In one embodiment, the first signaling is cell specific.

In one embodiment, the first-type resource subset includes a positive integer number of Resource Elements (REs). The RE includes one subcarrier in frequency domain and one multicarrier symbol in time domain.

In one embodiment, the multicarrier symbol is an OFDM symbol.

In one embodiment, the multicarrier symbol is a Filtering Bank Multiple Carrier (FBMC) symbol.

In one embodiment, the multicarrier symbol is a Single Carrier Frequency Division Multiple Access (SC-FDMA) symbol.

In one embodiment, any two of the P1 first-type time-frequency resources include different numbers of REs.

In one embodiment, the M1 is related to a number of REs in the first-type resource subset occupied by the first radio signal.

In one subembodiment, a length of the first sequence is configured through a downlink higher-layer signaling.

In one embodiment, at a given time, the first-type resource subset occupies at most one subcarrier in frequency domain.

In one embodiment, all of the P1 first-type time-frequency resources occupy a same number of subcarriers.

According to one aspect of the disclosure, the above method further includes:

receiving a second signaling.

Herein, the second signaling is used for determining a second-type time-frequency resource set; the second-type time-frequency resource set includes P2 second-type resource subset(s); time-frequency resources occupied by the second radio signal belong to one second-type resource subset; the P2 is a positive integer; the second-type resource subset to which the time-frequency resources occupied by the second radio signal belong is used for determining a number of subcarriers occupied by the second radio signal.

In one embodiment, in the above aspect, the number of subcarriers occupied by the second radio signal is implicitly indicated, which saves corresponding control information and improves efficiency of transmission.

In one embodiment, numbers of subcarriers occupied by radio signals transmitted in the P2 second-type resource subset(s) are one-to-one corresponding to P2 positive integer(s).

In one embodiment, any two of the P2 positive integer(s) are not equal.

In one embodiment, subcarriers occupied by the second radio signal are consecutive in frequency domain.

In one embodiment, the second signaling is a higher-layer signaling.

In one embodiment, the second signaling is an RRC layer signaling.

In one embodiment, the second signaling is cell specific.

In one embodiment, the second signaling is Transmission Reception Point (TRP) specific.

In one embodiment, the second signaling is beam specific, or the first signaling is beam-group specific.

According to one aspect of the disclosure, the above method is characterized in that: the first sequence is used for determining a subcarrier spacing corresponding to subcarriers occupied by the second radio signal; or the second-type resource subset occupied by the second radio signal is used for determining a subcarrier spacing corresponding to subcarriers occupied by the second radio signal.

In one embodiment, the above aspect saves control information used for configuring a subcarrier spacing, and improves efficiency of transmission.

In one embodiment, the subcarrier spacing corresponding to subcarriers occupied by the second radio signal is one of 2.5 kHz, 3.75 kHz, 15 kHz, 30 kHz, 60 kHz, 120 kHz, 240 kHz or 480 kHz.

In one embodiment, the subcarrier spacing corresponding to subcarriers occupied by the second radio signal is associated with an index of the first sequence in a candidate sequence set. The candidate sequence set includes multiple candidate sequences.

In one embodiment, a length of the candidate sequence is unrelated to a number of REs occupied by the first radio signal.

In one embodiment, all candidate sequences in the candidate sequence set have a same length.

According to one aspect of the disclosure, the above method further includes:

receiving a fourth radio signal.

Herein, a measurement of the fourth radio signal is used for determining the M1.

In one embodiment, the M1 and the target set are both related to a measurement of the fourth radio signal. The above method minimizes scheduling constraints due to association of the M1 and the target set.

In one embodiment, the fourth radio signal includes at least one of a Primary Synchronization Signal (PSS) or a Secondary Synchronization Signal (SSS).

In one embodiment, the fourth radio signal includes a Channel Status Information Reference Signal (CSI-RS).

The disclosure provides a method in a base station for wireless communication, wherein the method includes:

receiving a first radio signal; and receiving a second radio signal.

Herein, the first radio signal includes M1 first radio sub-signal(s), and a first sequence is used for generating the first radio sub-signal; the second radio signal includes M2 second radio sub-signal(s), and a first bit block is used for generating the second radio sub-signal; the M1 is a positive integer, the M2 is a positive integer in a target set, and each element in the target set is a positive integer; and the target set is correlated with at least one of the M1 or the first sequence.

In one embodiment, the base station determines the target set according to the M1.

In one embodiment, the base station determines the target set according to the first sequence.

According to one aspect of the disclosure, the above method further includes:

transmitting a third radio signal.

Herein, the third radio signal is used for at least one of determining whether the first bit block needs to be retransmitted, adjusting a transmission timing of a receiver of the third radio signal or allocating resources for uplink transmission to a receiver of the third radio signal; M3 is used for determining at least one of a starting time of time-domain resources occupied by the third radio signal or time-domain resources occupied by the third radio signal; and the M3 is one element in the target set.

According to one aspect of the disclosure, the above method further includes:

transmitting a first signaling.

Herein, the first signaling is used for determining a first-type time-frequency resource set; the first-type time-frequency resource set includes P1 first-type resource subset(s); the first radio signal occupies one first-type resource subset; the P1 is a positive integer; the first-type resource subset occupied by the first radio signal is used for determining at least one of air-interface resources occupied by the second radio signal or the M1; and the air-interface resources include at least the former one of time-frequency resources or code-domain resources.

According to one aspect of the disclosure, the above method further includes:

transmitting a second signaling.

Herein, the second signaling is used for determining a second-type time-frequency resource set; the second-type time-frequency resource set includes P2 second-type resource subset(s); time-frequency resources occupied by the second radio signal belong to one second-type resource subset; the P2 is a positive integer; the second-type resource subset to which the time-frequency resources occupied by the second radio signal belong is used for determining a number of subcarriers occupied by the second radio signal.

According to one aspect of the disclosure, the above method is characterized in that: the first sequence is used for determining a subcarrier spacing corresponding to subcarriers occupied by the second radio signal; or the second-type resource subset occupied by the second radio signal is used for determining a subcarrier spacing corresponding to subcarriers occupied by the second radio signal.

According to one aspect of the disclosure, the above method further includes:

transmitting a fourth radio signal.

Herein, a measurement of the fourth radio signal is used for determining the M1.

The disclosure provides a UE for wireless communication, wherein the UE includes:

a first transceiver, to transmit a first radio signal; and a first transmitter, to transmit a second radio signal.

Herein, the first radio signal includes M1 first radio sub-signal(s), and a first sequence is used for generating the first radio sub-signal; the second radio signal includes M2 second radio sub-signal(s), and a first bit block is used for generating the second radio sub-signal; the M1 is a positive integer, the M2 is a positive integer in a target set, and each element in the target set is a positive integer; and the target set is correlated with at least one of the M1 or the first sequence.

In one embodiment, the above UE for wireless communication further includes:

a first receiver, to receive a third radio signal.

Herein, the third radio signal is used for at least one of determining whether the first bit block needs to be retransmitted, adjusting a transmission timing of the UE or allocating resources for uplink transmission to the UE; M3 is used for determining at least one of a starting time of time-domain resources occupied by the third radio signal or time-domain resources occupied by the third radio signal; and the M3 is one element in the target set.

In one embodiment, the above UE for wireless communication is characterized in that: the first transceiver further receives a first signaling; wherein the first signaling is used for determining a first-type time-frequency resource set; the first-type time-frequency resource set includes P1 first-type resource subset(s); the first radio signal occupies one first-type resource subset; the P1 is a positive integer; the first-type resource subset occupied by the first radio signal is used for determining at least one of air-interface resources occupied by the second radio signal or the M1; and the air-interface resources include at least the former one of time-frequency resources or code-domain resources.

In one embodiment, the above UE for wireless communication is characterized in that: the first transceiver further receives a second signaling; wherein the second signaling is used for determining a second-type time-frequency resource set; the second-type time-frequency resource set include P2 second-type resource subset(s); time-frequency resources occupied by the second radio signal belong to one second-type resource subset; the P2 is a positive integer; the second-type resource subset to which the time-frequency resources occupied by the second radio signal belong is used for determining a number of subcarriers occupied by the second radio signal.

In one embodiment, the above UE for wireless communication is characterized in that: the first transceiver further receives a fourth radio signal, wherein a measurement of the fourth radio signal is used for determining the M1.

In one embodiment, the above UE for wireless communication is characterized in that: the first sequence is used for determining a subcarrier spacing corresponding to subcarriers occupied by the second radio signal; or the second-type resource subset occupied by the second radio signal is used for determining a subcarrier spacing corresponding to subcarriers occupied by the second radio signal.

The disclosure provides a base station for wireless communication, wherein the base station includes:

a second transceiver, to receive a first radio signal; and
a second receiver, to receive a second radio signal.

Herein, the first radio signal includes M1 first radio sub-signal(s), and a first sequence is used for generating the first radio sub-signal; the second radio signal includes M2 second radio sub-signal(s), and a first bit block is used for generating the second radio sub-signal; the M1 is a positive integer, the M2 is a positive integer in a target set, and each element in the target set is a positive integer; and the target set is correlated with at least one of the M1 or the first sequence.

In one embodiment, the base station determines the target set according to the M1.

In one embodiment, the base station determines the target set according to the first sequence.

In one embodiment, the base station for wireless communication further includes:

a second transmitter, to transmit a third radio signal.

Herein, the third radio signal is used for at least one of determining whether the first bit block needs to be retransmitted, adjusting a transmission timing of a receiver of the third radio signal or allocating resources for uplink transmission to a receiver of the third radio signal; M3 is used for determining at least one of a starting time of time-domain resources occupied by the third radio signal or time-domain resources occupied by the third radio signal; and the M3 is one element in the target set.

In one embodiment, the base station for wireless communication is characterized in that: the second transceiver further transmits a first signaling; wherein the first signaling is used for determining a first-type time-frequency resource set; the first-type time-frequency resource set includes P1 first-type resource subset(s); the first radio signal occupies one first-type resource subset; the P1 is a positive integer; the first-type resource subset occupied by the first radio signal is used for determining at least one of air-interface resources occupied by the second radio signal or the M1; and the air-interface resources include at least the former one of time-frequency resources or code-domain resources.

In one embodiment, the base station for wireless communication is characterized in that: the second transceiver further transmits a second signaling; wherein the second signaling is used for determining a second-type time-frequency resource set; the second-type time-frequency resource set includes P2 second-type resource subset(s); time-frequency resources occupied by the second radio signal belong to one second-type resource subset; the P2 is a positive integer; the second-type resource subset to which the time-frequency resources occupied by the second radio signal belong is used for determining a number of subcarriers occupied by the second radio signal.

In one embodiment, the base station for wireless communication is characterized in that: the first sequence is used for determining a subcarrier spacing corresponding to subcarriers occupied by the second radio signal; or the second-type resource subset occupied by the second radio signal is used for determining a subcarrier spacing corresponding to subcarriers occupied by the second radio signal.

In one embodiment, the base station for wireless communication is characterized in that: the second transceiver further transmits a fourth radio signal, wherein a measurement of the fourth radio signal is used for determining the M1.

In one embodiment, compared with the prior art, the disclosure has the following technical advantages.

Air-interface resources occupied by uplink control information in grant-free communication are reduced, and efficiency of transmission is improved.

Scheduling constraints due to reduction of uplink control information are minimized.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if no conflict is caused.

Embodiment 1

Figure 1:
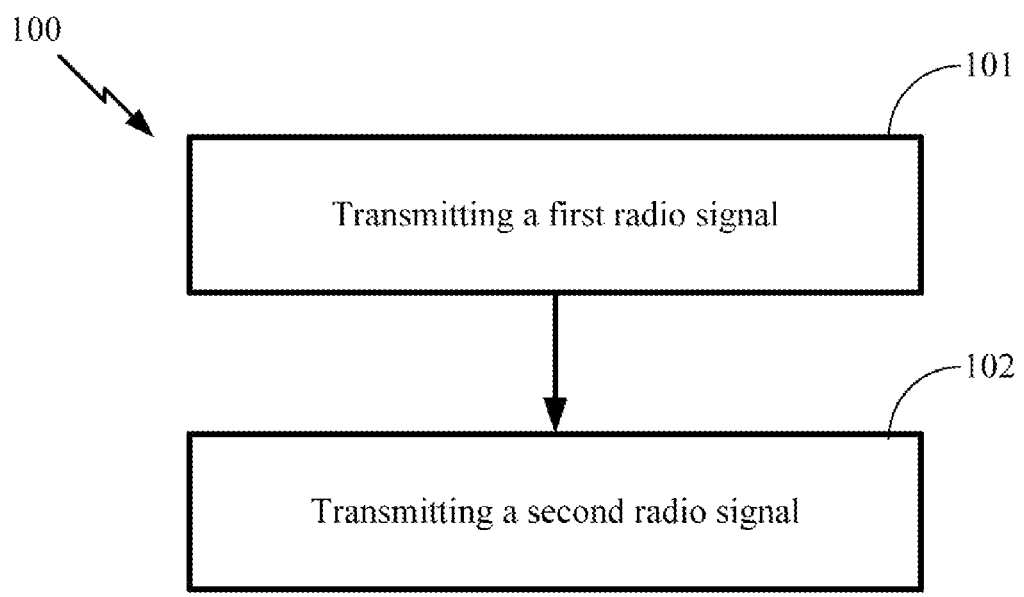
FIG. 1 is a flowchart of transmissions of a first radio signal and a second radio signal according to one embodiment of the disclosure.

Embodiment 1 illustrates an example of a flowchart of transmissions of a first radio signal and a second radio signal according to one embodiment of the disclosure, as shown in FIG. 1. In FIG. 1, each box represents a step. In Embodiment 1, the UE in the disclosure transmits a first radio signal in S101 and transmits a second radio signal in S102, wherein the first radio signal includes M1 first radio sub-signal(s), and a first sequence is used for generating the first radio sub-signal; the second radio signal includes M2 second radio sub-signal(s), and a first bit block is used for generating the second radio sub-signal; the M1 is a positive integer, the M2 is a positive integer in a target set, and each element in the target set is a positive integer; and the target set is correlated with at least one of the M1 or the first sequence.

In one embodiment, the first sequence is a pseudorandom sequence.

In one embodiment, the first sequence is a Zadoff-Chu sequence.

In one embodiment, the first sequence includes a CP.

In one embodiment, the first radio signal is transmitted on a PRACH.

In one embodiment, the target set is composed of one element (that is, the M2).

In one embodiment, the target set is composed of multiple elements.

In one embodiment, a receiver of the second radio signal determines the M2 from the target set through a blind detection.

In one embodiment, the target set is correlated with the M1, and the first sequence is used for determining an index of the M2 in the target set.

In one subembodiment, an index of the first sequence in a candidate sequence set is equal to an index of the M2 in the target set; and the candidate sequence set includes multiple candidate sequences.

In one embodiment, a length of the candidate sequence is related to a number of REs occupied by the first radio signal.

In one embodiment, all candidate sequences in the candidate sequence set have a same length (that is, a number of elements).

In one embodiment, the first bit block is transmitted from a higher layer of the UE to a physical layer of the UE.

In one embodiment, the higher layer is an MAC layer.

In one embodiment, the higher layer is an RLC layer.

In one embodiment, the M1 is a positive integer number power of 2, or 1.

In one embodiment, the M2 is a positive integer number power of 2, or 1.

In one embodiment, the first bit block is one TB.

In one embodiment, the first bit block is transmitted on a UL-SCH.

In one embodiment, the second radio signal is transmitted on a PUSCH.

In one embodiment, the second radio signal is an output after the first bit block is processed in sequence through channel coding, modulation mapper, layer mapper, precoding, resource element mapper, and generation of OFDM signals.

In one embodiment, the channel coding includes rate matching.

In one embodiment, the transmission of the first radio signal is grant-free.

In one embodiment, the transmission of the first radio signal is contention-based.

In one embodiment, the transmission of the second radio signal is grant-free.

In one embodiment, the transmission of the second radio signal is contention-based.

Embodiment 2

Figure 2:
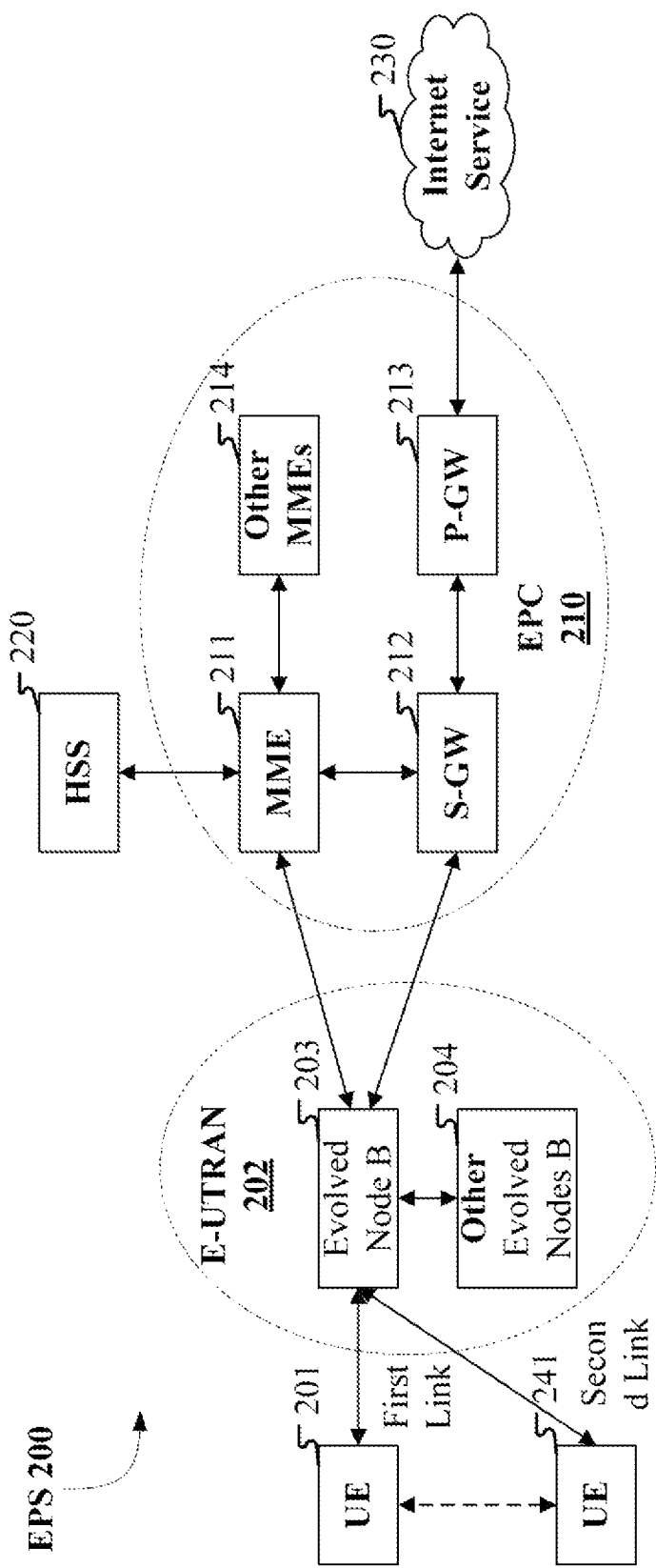
FIG. 2 is a diagram illustrating a network architecture according to one embodiment of the disclosure.

Embodiment 2 illustrates an example of a diagram of a network architecture according to the disclosure, as shown in FIG. 2. FIG. 2 is a diagram illustrating a network architecture 200 of LTE, Long-Term Evolution Advanced (LTE-A), Narrow Band Internet of Things (NB-IoT) and future 5G systems. The LTE network architecture 200 may be called an Evolved Packet System (EPS) 200. The EPS 200 may include one or more UEs 201, an Evolution UMTS Terrestrial Radio Access Network (E-UTRAN) 202, an Evolved Packet Core (EPC) 210, a Home Subscriber Server (HSS) 220 and an Internet Service 230. Herein, the UMTS corresponds to Universal Mobile Telecommunications System. The EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services. The E-UTRAN includes an evolved node B (eNB) 203 and other eNBs 204. The eNB 203 provides UE 201 oriented user plane and control plane protocol terminations. The eNB 203 may be connected to other eNBs 204 via an Xn interface (for example, backhaul). The eNB 203 may be called a base station, a base transceiver station, a radio base station, a radio transceiver, a transceiver function, a Basic Service Set (BSS), an Extended Service Set (ESS), a TRP or other appropriate terms. The eNB 203 provides an access point of the EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The eNB 203 is connected to the EPC 210 via an Si interface. The EPC 210 includes a Mobility Management Entity (MME) 211, other MMES 214, a Service Gateway (S-GW) 212 and a Packet Data Network Gateway (P-GW) 213. The MME 211 is a control node for processing a signaling between the UE 201 and the EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the internet service 230. The internet service 230 includes IP services corresponding to operators, specifically including internet, intranet, IP Multimedia Subsystems (IP IMSs) and PS Streaming Services (PSSs).

In one embodiment, the UE 201 corresponds to the UE in the present disclosure.

In one embodiment, the eNB 203 corresponds to the base station in the present disclosure.

In one embodiment, the UE 201 supports grant-free transmission.

In one embodiment, the eNB 203 supports grant-free transmission.

Embodiment 3

Figure 3:
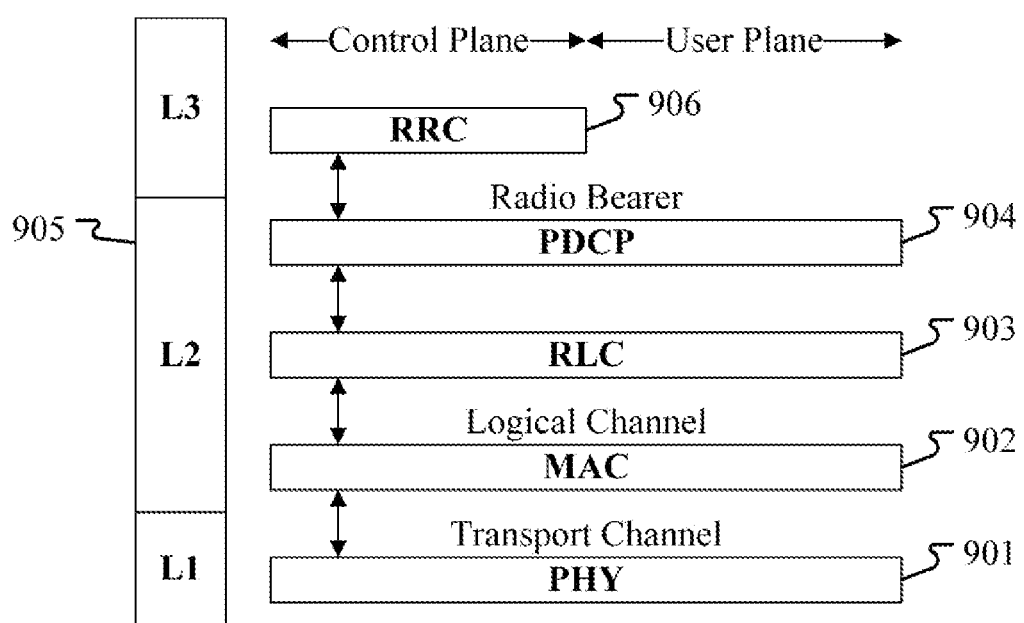
FIG. 3 is a diagram illustrating a radio protocol architecture of a user plane and a control plane according to one embodiment of the disclosure.

Embodiment 3 illustrates a diagram of an embodiment a radio protocol architecture of a user plane and a control plane according to the disclosure, as shown in FIG. 3. FIG. 3 is a diagram illustrating an embodiment of a radio protocol architecture of a user plane and a control plane. In FIG. 3, the radio protocol architecture of a UE and a base station (gNB or eNB) is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the eNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the eNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between eNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the eNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the eNB and the UE.

In one embodiment, the radio protocol architecture shown in FIG. 3 is applicable to the UE in the disclosure.

In one embodiment, the radio protocol architecture shown in FIG. 3 is applicable to the base station in the disclosure.

In one embodiment, the first radio signal in the disclosure is generated by the PHY 301.

In one embodiment, the second radio signal in the disclosure is generated by the RRC 306.

In one embodiment, the third radio signal in the disclosure is generated by the PHY 301.

In one embodiment, the third radio signal in the disclosure is generated by the MAC 302.

In one embodiment, the third radio signal in the disclosure is generated by the PHY 301.

In one embodiment, the fourth radio signal in the disclosure is generated by the PHY 301.

In one embodiment, the first signaling in the disclosure is generated by the PHY 301.

In one embodiment, the first signaling in the disclosure is generated by the MAC 302.

In one embodiment, the first signaling in the disclosure is generated by the PHY 301.

In one embodiment, the second signaling in the disclosure is generated by the PHY 301.

In one embodiment, the second signaling in the disclosure is generated by the MAC 302.

In one embodiment, the second signaling in the disclosure is generated by the PHY 301.

Embodiment 4

Figure 4:
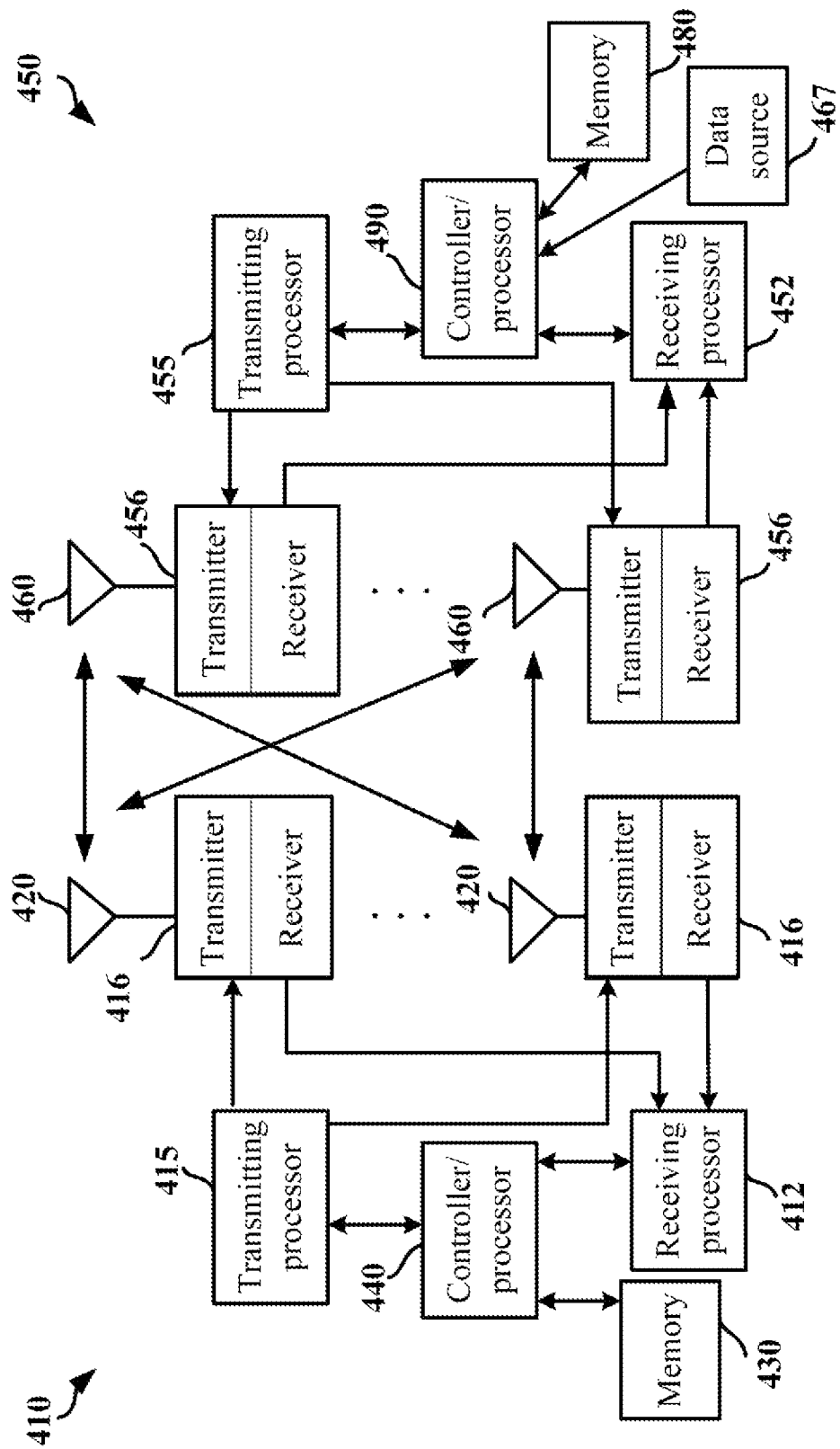
FIG. 4 is a diagram illustrating a base station and a UE according to one embodiment of the disclosure.

Embodiment 4 illustrates a diagram of a base station and a given UE according to the disclosure, as shown in FIG. 4. FIG. 4 is a block diagram of a gNB/eNB 410 in communication with a UE 450 in an access network.

The UE 450 includes a controller/processor 490, a memory 480, a receiving processor 452, a transmitter/receiver 456, a transmitting processor 455 and a data source 467. The transmitter/receiver 456 includes an antenna 460. The data source 467 provides higher-layer packets to the controller/processor 490. The controller/processor 490 provides header compression/decompression, encryption/decryption, packet segmentation and reordering, multiplexing/de-multiplexing between a logical channel and a transport channel, to implement L2 protocols used for the user plane and the control plane. The higher-layer packet may include data or control information, for example, Downlink Shared Channel (DL-SCH) or Uplink Shared Channel (UL-SCH). The transmitting processor 455 performs various signal transmitting processing functions of L1 layer (that is, PHY), including encoding, interleaving, scrambling, modulation, power control/allocation, precoding, generation of physical layer control signalings, etc. The receiving processor 452 performs various signal receiving processing functions of L1 layer (that is, PHY), including decoding, de-interleaving, descrambling, demodulation, de-precoding, extraction of physical layer control signalings, etc. The transmitter 456 is configured to convert a baseband signal provided by the transmitting processor 455 into a radio-frequency signal and transmit the radio-frequency signal via the antenna 460. The receiver 456 is configured to convert a radio-frequency signal received via the antenna 460 into a baseband signal and provide the baseband signal to the receiving processor 452.

The base station 410 may include a controller/processor 440, a memory 430, a receiving processor 412, a transmitter/receiver 416 and a transmitting processor 415. The transmitter/receiver 416 includes an antenna 420. Higher-layer packets are provided to the controller/processor 440. The controller/processor 440 provides header compression/decompression, encryption/decryption, packet segmentation and reordering, multiplexing/de-multiplexing between a logical channel and a transport channel, to implement L2 protocols used for the user plane and the control plane. The higher-layer packet may include data or control information, for example, DL-SCH or UL-SCH. The transmitting processor 415 performs various signal transmitting processing functions of L1 layer (that is, PHY), including encoding, interleaving, scrambling, modulation, power control/allocation, precoding, generation of physical layer control signalings (including Physical Broadcasting Channel (PBCH), Physical Downlink Control Channel (PDCCH), and reference signal), etc. The receiving processor 412 performs various signal receiving processing functions of L1 layer (that is, PHY), including decoding, de-interleaving, descrambling, demodulation, de-precoding, extraction of physical layer control signalings, etc. The transmitter 416 is configured to convert a baseband signal provided by the transmitting processor 415 into a radio-frequency signal and transmit the radio-frequency signal via the antenna 420. The receiver 416 is configured to convert a radio-frequency signal received via the antenna 420 into a baseband signal and provide the baseband signal to the receiving processor 412.

In Downlink (DL) transmission, a higher-layer packet DL-SCH, including the first signaling, the second signaling and the third radio signal in the disclosure, is provided to the controller/processor 440. The controller/processor 440 performs functions of L2 layer. In DL transmission, the controller/processor 440 provides header compression, encryption, packet segmentation and reordering, multiplexing between a logical channel and a transport channel, and radio resource allocation for the UE 450 based on various priority metrics. The controller/processor 440 is also in charge of HARQ operation, retransmission of lost packets, and signalings to the UE 450. The transmitting processor 415 performs various signal processing functions of L1 layer (that is, PHY); the fourth radio signal in the disclosure is generated at the transmitting processor 415. The signal processing function includes coding and interleaving, so as to facilitate FEC (Forward Error Correction) at the UE 450 side and demodulation of baseband signals corresponding to different modulation schemes (i.e., BPSK, QPSK, etc.). The modulated symbols are split into parallel streams. Each of the parallel streams is mapped to corresponding subcarriers of multi-carriers and/or multi-carrier symbols. Then the transmitting processor 415 maps the parallel streams to the antenna 420 via the transmitter 416 so as to transmit the parallel streams in the form of Radio Frequency (RF) signals. The physical layer transmission of the first signaling, the second signaling and the third radio signal, and the fourth radio signal in the disclosure are mapped to target air-interface resources by the transmitting processor 415 and are mapped to the antenna 420 via the transmitter 416 so as to be transmitted in the form of RF signals. At the receiving side, every receiver 456 receives an RF signal via the corresponding antenna 460. Every receiver 456 recovers the baseband information modulated to the RF carrier and provides the baseband information to the receiving processor 452. The receiving processor 452 performs various signal receiving processing functions of L1 layer. The signal receiving processing functions include a measurement of the fourth radio signal in the disclosure and a reception of a physical layer signal carrying the first signaling, the second signaling and the third radio signal, conducting demodulation corresponding to different modulation schemes (i.e., BPSK, QPSK, etc.) through multi-carrier symbols in multi-carrier symbol streams, then decoding and de-interleaving to recover the data or control signal transmitted by the gNB 410 on the physical channel, and then providing the data and control signal to the controller/processor 490. The controller/processor 490 performs functions of L2 layer. The controller/processor may be connected to the memory 480 that stores program codes and data. The memory 480 may be called a computer readable medium.

In Uplink (UL) transmission, the data source 467 provides the second radio signal in the disclosure to the controller/processor 490. The data source 467 illustrates all the protocol layers above the L2 layer. The controller/processor 490 provides header compression, encryption, packet segmentation and reordering, and multiplexing between a logical channel and a transport channel through the radio resource allocation based on the gNB 410, to implement the L2 layer protocols used for the user plane and the control plane. The controller/processor 490 is also in charge of HARQ operation, retransmission of lost packets, and signalings to the gNB 410. The transmitting processor 415 performs various signal transmitting processing functions of L1 layer (that is, PHY). The first radio signal in the disclosure is generated by the transmitting processor 455. The signal transmitting processing function includes coding and interleaving, so as to facilitate FEC (Forward Error Correction) at the UE 450 side and demodulation of baseband signals corresponding to different modulation schemes (i.e., BPSK, QPSK, etc.). The modulated symbols are split into parallel streams. Each of the parallel streams is mapped to corresponding subcarriers of multi-carriers and/or multi-carrier symbols. Then the transmitting processor 455 maps the parallel streams to the antenna 460 via the transmitter 456 so as to transmit the parallel streams in the form of RF signals. The receiver 416 receives an RF signal via the corresponding antenna 420. Every receiver 416 recovers the baseband information modulated to the RF carrier and provides the baseband information to the receiving processor 412. The receiving processor 412 performs various signal receiving processing functions of L1 layer. The signal receiving processing functions include acquiring multicarrier symbol streams, conducting demodulation corresponding to different modulation schemes (i.e., BPSK, QPSK, etc.) on multi-carrier symbols in the multicarrier symbol streams, then decoding and de-interleaving to recover the data or control signal originally transmitted by the UE 450 on the physical channel; the reception of the first radio signal in the disclosure is accomplished at the receiving processor 412. Then, the data and/or control signal are/is provided to the controller/processor

440. The controller/processor 440 performs functions of L2 layer. The controller/processor may be connected to the memory 430 that stores program codes and data. The memory 430 may be called a computer readable medium.

In one embodiment, the UE 450 device includes at least one processor and at least one memory. The at least one memory includes computer program codes. The at least one memory and the computer program codes are configured to be used in collaboration with the at least one processor. The UE 450 device at least transmits a first radio signal and transmits a second radio signal; wherein the first radio signal includes M1 first radio sub-signal(s), and a first sequence is used for generating the first radio sub-signal; the second radio signal includes M2 second radio sub-signal(s), and a first bit block is used for generating the second radio sub-signal; the M1 is a positive integer, the M2 is a positive integer in a target set, and each element in the target set is a positive integer; and the target set is correlated with at least one of the M1 or the first sequence.

In one embodiment, the UE 450 includes a memory that stores a computer readable instruction program. The computer readable instruction program generates an action when executed by at least one processor. The action includes: transmitting a first radio signal, and transmitting a second radio signal; wherein the first radio signal includes M1 first radio sub-signal(s), and a first sequence is used for generating the first radio sub-signal; the second radio signal includes M2 second radio sub-signal(s), and a first bit block is used for generating the second radio sub-signal; the M1 is a positive integer, the M2 is a positive integer in a target set, and each element in the target set is a positive integer; and the target set is correlated with at least one of the M1 or the first sequence.

In one embodiment, the eNB 410 includes at least one processor and at least one memory. The at least one memory includes computer program codes. The at least one memory and the computer program codes are configured to be used in collaboration with the at least one processor. The gNB 410 at least receives a first radio signal and receives a second radio signal; wherein the first radio signal includes M1 first radio sub-signal(s), and a first sequence is used for generating the first radio sub-signal; the second radio signal includes M2 second radio sub-signal(s), and a first bit block is used for generating the second radio sub-signal; the M1 is a positive integer, the M2 is a positive integer in a target set, and each element in the target set is a positive integer; and the target set is correlated with at least one of the M1 or the first sequence.

In one embodiment, the eNB 410 includes a memory that stores a computer readable instruction program. The computer readable instruction program generates an action when executed by at least one processor. The action includes: receiving a first radio signal, and receiving a second radio signal; wherein the first radio signal includes M1 first radio sub-signal(s), and a first sequence is used for generating the first radio sub-signal; the second radio signal includes M2 second radio sub-signal(s), and a first bit block is used for generating the second radio sub-signal; the M1 is a positive integer, the M2 is a positive integer in a target set, and each element in the target set is a positive integer; and the target set is correlated with at least one of the M1 or the first sequence.

In one embodiment, the UE 450 corresponds to the UE in the disclosure.

In one embodiment, the gNB 410 corresponds to the base station in the disclosure.

In one embodiment, the transmitter 456 (including antenna 460) and the transmitting processor 455 are used for transmitting the first radio signal in the disclosure.

In one embodiment, the transmitter 456 (including antenna 460), the transmitting processor 455 and the controller/processor 490 are used for transmitting the second first radio signal in the disclosure.

In one embodiment, the receiver 456 (including antenna 460), the receiving processor 452 and the controller/processor 490 are used for receiving the third radio signal in the disclosure.

In one embodiment, the receiver 456 (including antenna 460) and the receiving processor 452 are used for receiving the fourth radio signal in the disclosure.

In one embodiment, the receiver 456 (including antenna 460), the receiving processor 452 and the controller/processor 490 are used for receiving the first signaling in the disclosure.

In one embodiment, the receiver 456 (including antenna 460), the receiving processor 452 and the controller/processor 490 are used for receiving the second signaling in the disclosure.

In one embodiment, the receiver 416 (including antenna 420) and the receiving processor 412 are used for receiving the first radio signal in the disclosure.

In one embodiment, the receiver 416 (including antenna 420), the receiving processor 412 and the controller/processor 440 are used for receiving the second radio signal in the disclosure.

In one embodiment, the transmitter 416 (including antenna 420), the transmitting processor 415 and the controller/processor 440 are used for transmitting the third radio signal in the disclosure.

In one embodiment, the transmitter 416 (including antenna 420) and the transmitting processor 415 are used for transmitting the fourth radio signal in the disclosure.

In one embodiment, the transmitter 416 (including antenna 420), the transmitting processor 415 and the controller/processor 440 are used for transmitting the first signaling in the disclosure.

In one embodiment, the transmitter 416 (including antenna 420), the transmitting processor 415 and the controller/processor 440 are used for transmitting the second signaling in the disclosure.

Embodiment 5

Figure 5:
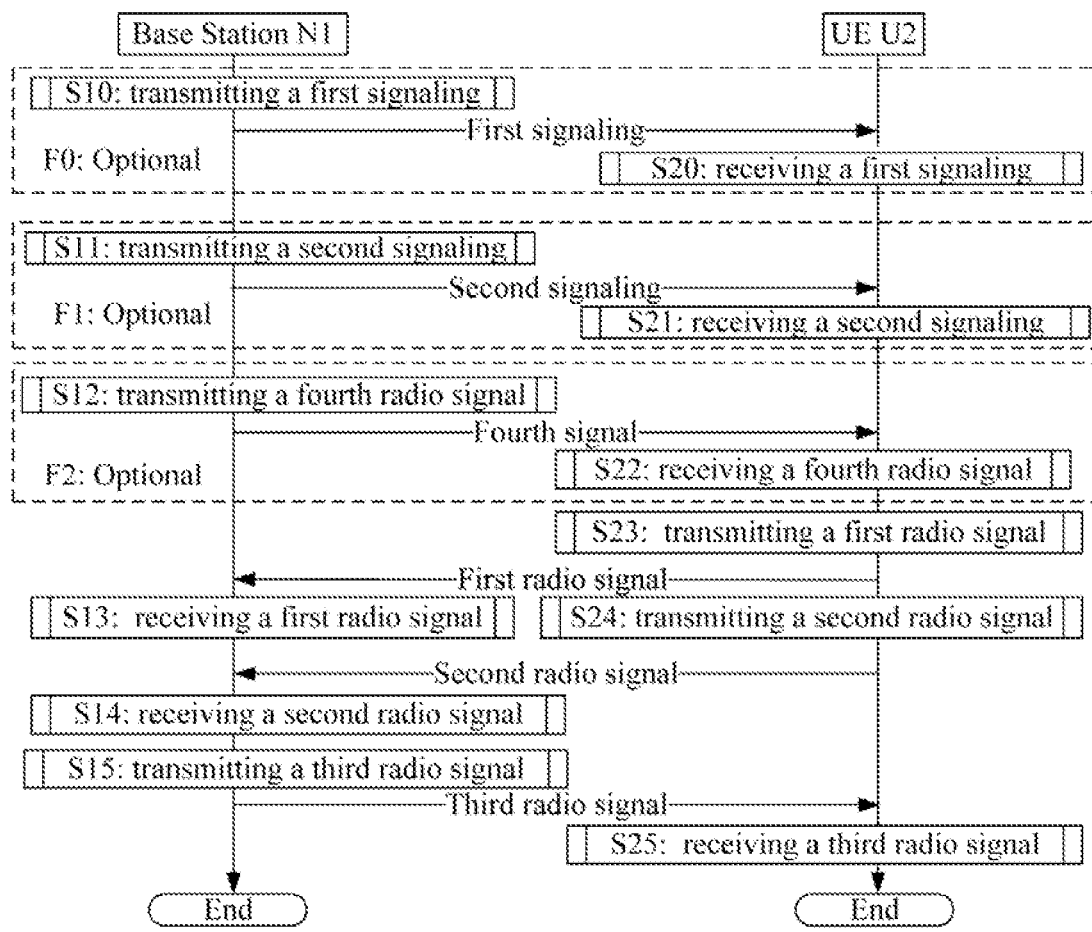
FIG. 5 is a flowchart of uplink transmission according to one embodiment of the disclosure.

Embodiment 5 illustrates an example of a flowchart of uplink transmission, as shown in FIG. 5. In FIG. 5, a base station N1 is a maintenance base station for a serving cell of a UE U2. Steps in box F0, box F1 and box F2 are optional respectively.

The base station N1 transmits a first signaling in S10, transmits a second signaling in S11, transmits a fourth radio signal in S12, receives a first radio signal in S13, receives a second radio signal in S14, and transmits a third radio signal in S15.

The UE U2 receives a first signaling in S20, receives a second signaling in S21, receives a fourth radio signal in S22, transmits a first radio signal in S23, transmits a second radio signal in S24, and receives a third radio signal in S25.

In Embodiment 5, the first radio signal includes M1 first radio sub-signal(s), and a first sequence is used for generating the first radio sub-signal. The second radio signal includes M2 second radio sub-signal(s), and a first bit block is used for generating the second radio sub-signal. The M1 is a positive integer, the M2 is a positive integer in a target set, and each element in the target set is a positive integer. The target set is correlated with at least one of the M1 or the first sequence. The third radio signal is used by the UE U2 for at least one of determining whether the first bit block needs to be retransmitted, adjusting a transmission timing, or determining resources for uplink transmission. M3 is used for determining at least one of a starting time of time-domain resources occupied by the third radio signal or time-domain resources occupied by the third radio signal; and the M3 is one element in the target set. The first signaling is used by the UE U2 to determine a first-type time-frequency resource set. The first-type time-frequency resource set includes P1 first-type resource subset(s). The first radio signal occupies one first-type resource subset. The P1 is a positive integer. The first-type resource subset occupied by the first radio signal is used for determining at least one of air-interface resources occupied by the second radio signal or the M1. The air-interface resources include at least the former one of time-frequency resources or code-domain resources. The second signaling is used by the UE U2 to determine a second-type time-frequency resource set. The second-type time-frequency resource set includes P2 second-type resource subset(s). Time-frequency resources occupied by the second radio signal belong to one second-type resource subset. The P2 is a positive integer. The second-type resource subset to which the time-frequency resources occupied by the second radio signal belong is used for determining a number of subcarriers occupied by the second radio signal. A measurement of the fourth radio signal is used for determining the M1.

In one embodiment, the second radio signal includes a DeModulation Reference Signal (DMRS).

In one embodiment, time-domain resources occupied by the M1 first radio sub-signal(s) are orthogonal to each other pairwise.

In one embodiment, time-domain resources occupied by the M2 second radio sub-signal(s) are orthogonal to each other pairwise.

In one embodiment, the second radio signal is transmitted on a physical layer control channel.

In one embodiment, the first bit block includes uplink control information.

In one embodiment, the first sequence is used for determining a subcarrier spacing corresponding to subcarriers occupied by the second radio signal; or the second-type resource subset occupied by the second radio signal is used for determining a subcarrier spacing corresponding to subcarriers occupied by the second radio signal.

In one embodiment, the M2 is greater than or equal to the M1.

In one embodiment, the target set is composed of one element, that is, the M2.

In one embodiment, the first signaling is an RRC layer signaling.

In one embodiment, the second signaling is an RRC layer signaling.

In one embodiment, the first sequence is a PRACH preamble.

In one embodiment, the first bit block includes a positive integer number of bits.

In one embodiment, the first bit block is one TB.

In one embodiment, the third radio signal includes a HARQ-ACK, and the HARQ-ACK indicates whether the base station N1 correctly decodes the second radio signal.

In one embodiment, the third radio signal includes a DCI, the DCI is used for an uplink grant of the UE U2, an uplink transmission scheduled by the DCI and the second radio signal belong to one same Hybrid Automatic Repeat reQuest (HARD) process, the DCI includes at least one of a New Data Indicator (NDI) field or a Resource Allocation (RA) field, the NDI field in the DCI indicates whether the UE U2 retransmits the first bit block, and the RA field in the DCI indicates air-interface resources for uplink transmission allocated to the UE U2.

In one embodiment, the third radio signal includes a Random Access Response (RAR) for the first radio signal, and the RAR indicates a timing adjustment, a user identifier or an uplink transmission resource for the UE U2.

In one embodiment, the user identifier is a Cell Radio Network Temporary Identifier (C-RNTI).

In one embodiment, the user identifier includes 16 binary bits.

In one embodiment, a multiple access mode corresponding to the second radio signal is a Sparse Code Multiple Access (SCMA), and the air-interface resource includes time-frequency resources and code-domain resources.

In one embodiment, at least two of the P2 second-type resource subsets have a shared subcarrier in frequency domain.

In one embodiment, the P2 second-type resource subset(s) belong(s) to 12 consecutive subcarriers in frequency domain.

In one embodiment, any two of the P2 second-type resource subsets are orthogonal in frequency domain (that is, having no shared subcarrier).

In one embodiment, a time-domain position of the first-type resource subset occupied by the first radio signal is correlated with Q candidate time(s), and a starting time in time domain of the second-type resource subset occupied by the second radio signal is one of the Q candidate time(s). The Q is positive integer. In one subembodiment, the Q candidate time(s) is(are) behind an ending time of the first-type resource subset occupied by the first radio signal. In one subembodiment, the Q is greater than 1, and the Q candidate times are distributed with equal intervals.

Embodiment 6

Figure 6:
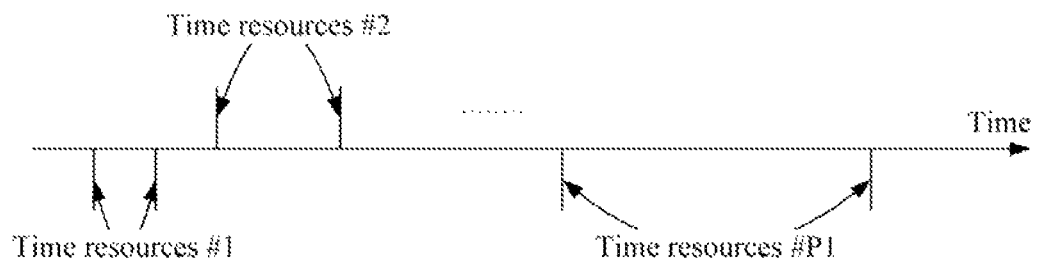
FIG. 6 is a diagram illustrating a first-type time-frequency resource set according to one embodiment of the disclosure.

Embodiment 6 illustrates an example of a diagram of a first-type time-frequency resource set, as shown in FIG. 6.

In Embodiment 6, a first-type time-frequency resource set includes P1 first-type resource subsets, and any two of the P1 first-type resource subsets are orthogonal in time domain (that is, not overlapping).

As shown in FIG. 6, the P1 first-type resource subsets occupy time resources #1, #2, . . . , #P1 in time domain respectively.

In one embodiment, the first-type resource subset occupies consecutive multicarrier symbols in time domain.

In one embodiment, a time length occupied by the first-type resource subset occupied by the first radio signal in the disclosure is in linear correlation with the M1 in the disclosure.

In one embodiment, time lengths occupied by the P1 first-type resource subsets increase in turn.

In one subembodiment, a time length occupied by any one of the P1 first-type resource subsets is a positive integer multiple of a time resource #1.

In one subembodiment, the first radio signal is transmitted in the time resource #1, and the M1 in the disclosure is 1.

Embodiment 7

Figure 7:
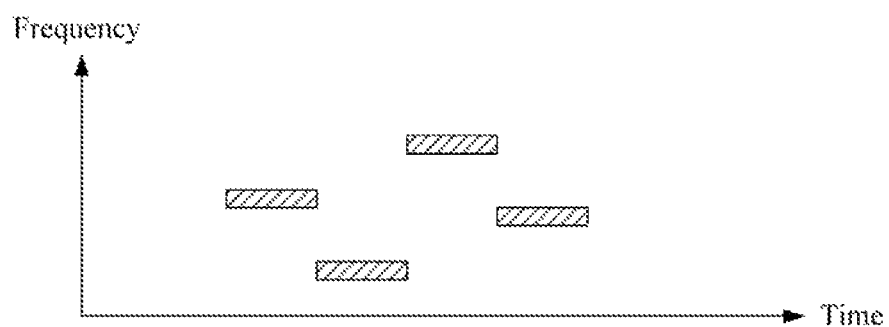
FIG. 7 is a diagram illustrating one first-type resource subset according to one embodiment of the disclosure.

Embodiment 7 illustrates an example of a diagram of one first-type resource subset according to one embodiment of the disclosure, as shown in FIG. 7. In FIG. 7, grids filled with slashes represent time-frequency resources belonging to one first-type resource subset.

As shown in FIG. 7, the first-type resource subset occupies variable subcarriers at different times.

In one embodiment, at a given time, the first-type resource subset occupies only one subcarrier in frequency domain.

In one embodiment, all subcarriers occupied by the first-type resource subset at different times belong to a target subcarrier set, and the target subcarrier set is composed of 12 consecutive subcarriers.

In one embodiment, a subcarrier spacing of the subcarriers is 3.75 kHz.

In one embodiment, a subcarrier spacing of the subcarriers is 15 kHz.

In one embodiment, a subcarrier spacing of the subcarriers is a positive integer multiple of 15 kHz.

In one embodiment, a variation of subcarriers occupied by the first-type resource subset is used for determining at least one of the M1 in the disclosure, a user identifier of a transmitter of the first radio signal in the disclosure or a subcarrier spacing of subcarriers occupied by the second radio signal in the disclosure.

Embodiment 8

Figure 8:
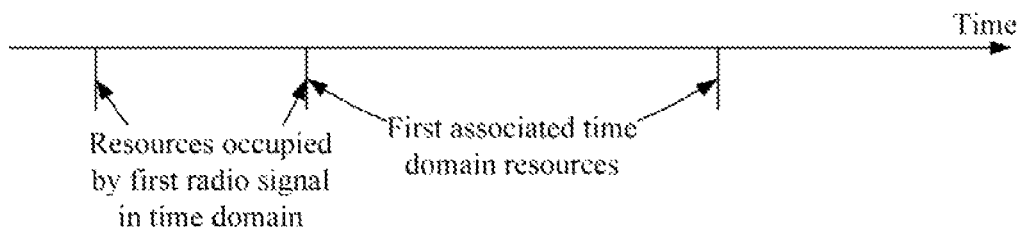
FIG. 8 is a diagram illustrating time-domain resources associated with a first radio signal according to one embodiment of the disclosure.

Embodiment 8 illustrates an example of a diagram of time-domain resources associated with a first radio signal according to one embodiment of the disclosure, as shown in FIG. 8.

In FIG. 8, resources occupied by the first radio signal in time domain indicate implicitly first associated time-domain resources. Resources occupied by the second radio signal in time domain belong to the first associated time-domain resources.

In one embodiment, the P2 second-type resource subset(s) in the disclosure all belong(s) to the first associated time-domain resources in time domain.

In one subembodiment, the first radio signal in the disclosure and the second signaling in the disclosure are used for determining the P2 second-type resource subset(s) in the disclosure.

In one embodiment, resources occupied by the first radio signal in time domain and the first associated time-domain resources are consecutive.

In one embodiment, resources occupied by the first radio signal in time domain and the first associated time-domain resources are orthogonal (that is, not overlapping).

In one embodiment, a time length of the first associated time-domain resources is correlated with a time length of resources occupied by the first radio signal in time domain.

In one subembodiment, a time length of the first associated time-domain resources increases with an increase of a time length of resources occupied by the first radio signal in time domain.

In one subembodiment, a time length of the first associated time-domain resources is in liner correlation with a time length of resources occupied by the first radio signal in time domain.

In one embodiment, the target set in the disclosure is composed of multiple positive integers; when the M2 in the disclosure is equal to a maximum positive integer in the target set, the second radio signal in the disclosure occupies all multicarrier symbols in the first associated time-domain resources.

Embodiment 9

Figure 9:
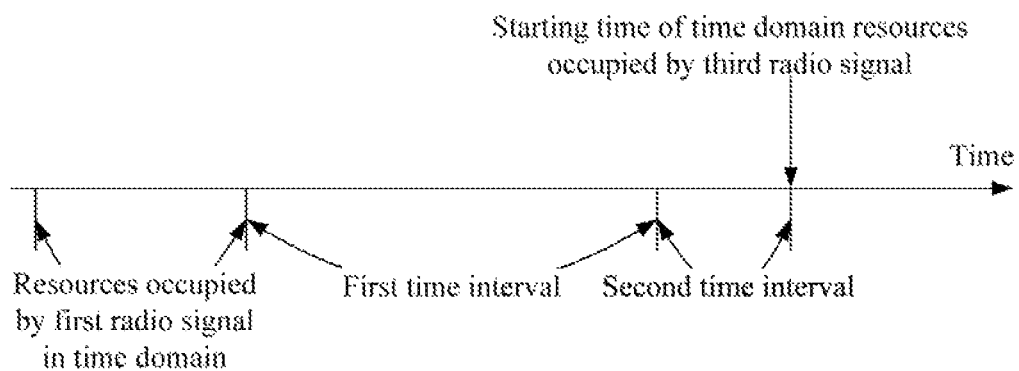
FIG. 9 is a diagram illustrating a starting time of time-domain resources occupied by a third radio signal according to one embodiment of the disclosure.

Embodiment 9 illustrates an example of a diagram of a starting time of time-domain resources occupied by a third radio signal according to one embodiment of the disclosure, as shown in FIG. 9.

In FIG. 9, between a starting time of time-domain resources occupied by a third radio signal and an ending time of time-domain resources occupied by the first radio signal includes a first time interval and a second time interval.

In one embodiment, time-domain resources occupied by the second radio signal belong to the first time interval.

In one embodiment, the first time interval is the first associated time-domain resources mentioned in Embodiment 4.

In one embodiment, a duration of the second time interval is greater than or equal to 4 ms.

In one embodiment, a duration of the second time interval is related to a duration of the first time interval.

In one embodiment, a transmitter of the first radio signal keeps a transmit power of zero during the second time interval.

In one embodiment, the first time interval is M3 times of a reference time interval, and the reference time interval is a length of time-domain resources occupied by the second radio sub-signal in the disclosure. The M3 is one element in a target set.

In one subembodiment, the M3 is a minimum value in the target set. A time length from an ending time of time-domain resources occupied by the third radio signal to a reference time is the second time interval, and the ending time of time-domain resources occupied by the third radio signal is behind the reference time. The reference time is behind the first time interval, a time length from the reference time to an ending time of the first time interval is M4 times of the reference time interval, and the M4 is a maximum value in the target set.

In one subembodiment, the M3 is a maximum value in the target set.

In one subembodiment, the M3 is M2.

Embodiment 10

Figures 10, 11:
FIG. 10 is a diagram illustrating M1 and a corresponding target set according to one embodiment of the disclosure.
FIG. 11 is a diagram illustrating a second-type resource subset according to one embodiment of the disclosure.

Embodiment 10 illustrates an example of a diagram of M1 and a corresponding target set according to one embodiment of the disclosure, as shown in FIG. 10.

In FIG. 10, possible values of the M1 are 1, 4, 16; and corresponding target sets are {1, 2}, {2, 8} or {8, 32} respectively.

Embodiment 11

Embodiment 11 illustrates an example of a diagram of a second-type resource subset according to one embodiment of the disclosure, as shown in FIG. 11. In FIG. 11, a box filled with slashes and a box having a bold frame represent a second-type resource subset #1 and a second-type resource subset #2 respectively.

In Embodiment 11, the second-type resource subset #1 and the second-type resource subset #2 are two of the P2 second-type resource subsets in the disclosure. The second-type resource subset #1 and the second-type resource subset #2 have a shared subcarrier.

In one embodiment, the second-type resource subset #1 and the second-type resource subset #2 belong to one same Resource Block (RB). The RB is composed of 12 consecutive subcarriers.

Embodiment 12

Figure 12:
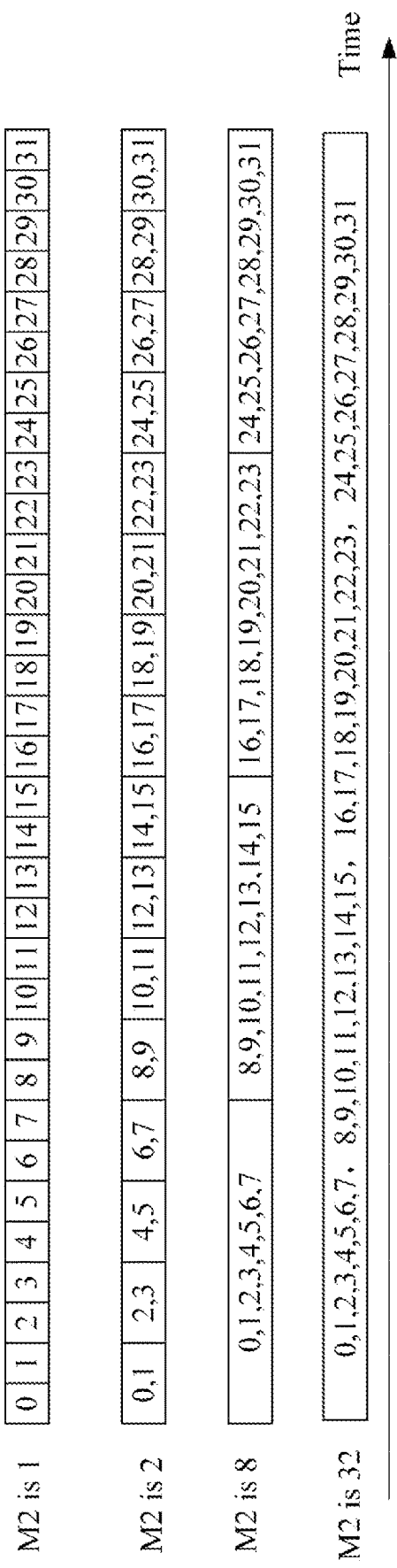
FIG. 12 is a diagram illustrating a second-type time-frequency resource set according to one embodiment of the disclosure.

Embodiment 12 illustrates an example of a diagram of a second-type time-frequency resource set according to one embodiment of the disclosure, as shown in FIG. 12. In FIG. 12, a grid filled with one number represents a time unit, a grid filled with two numbers represents two time units, a grid filled with eight numbers represents eight time units, and so on. One grid in FIG. 8 represents resources occupied by one second-type resource subset in time domain.

In Embodiment 12, the second-type time-frequency resource set includes 53 second-type resource subsets.

32 second-type resource subsets each are composed of 1 time unit, corresponding to grids 0 to 31 respectively.

16 second-type resource subsets each are composed of 2 time units, corresponding to grids {0, 1}, {2, 3}, . . . , {30, 31} respectively.

4 second-type resource subsets each are composed of 8 time units, corresponding to grids {0, 1, 2, . . . , 7}, {8, 9, . . . , 15}, . . . , {24, 25, . . . , 31} respectively.

1 second-type resource subset is composed of 32 time units, corresponding to a grid {0, 1, 2, . . . , 31} respectively.

In Embodiment 12, a base station detects the first radio signal to determine M1, and then determines a corresponding target set according to Embodiment 10.

In one embodiment, a base station determines M2 from the target set through a blind detection mode.

In one embodiment, a base station determines the second-type resource subset occupied by a second radio signal according to the target set through a blind detection mode.

In one embodiment, a hopping pattern of subcarriers occupied by a first radio signal or an index of a first sequence in a candidate sequence set is used by a base station to determine the second-type resource subset occupied by the second radio signal.

Embodiment 13

Figure 13:
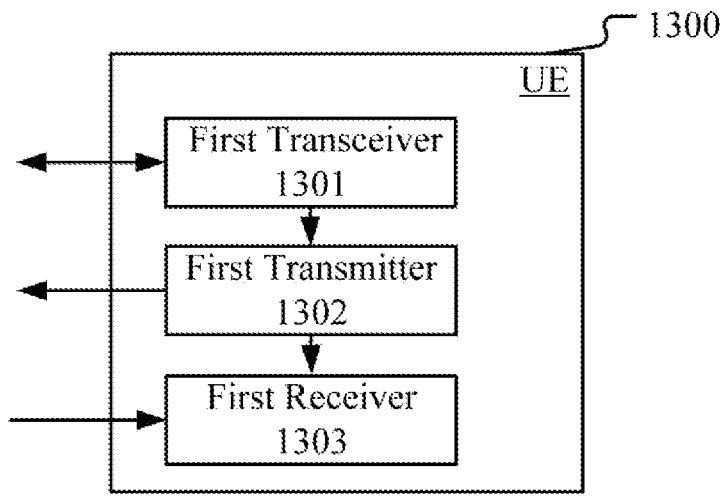
FIG. 13 is a structure block diagram illustrating a processing device in a UE according to one embodiment of the disclosure.

Embodiment 13 illustrates an example of a structure block diagram of a processing device in a UE, as shown in FIG. 13. In FIG. 13, the processing device 1300 in the UE includes a first transceiver 1301, a first transmitter 1302 and a first receiver 1303. The first transceiver 1301 includes the transmitter/receiver 456 (including antenna 460), the receiving processor 452 and the controller/processor 490 illustrated in FIG. 4 in the disclosure; the first transmitter 1302 includes the transmitter/receiver 456 (including antenna 460), the transmitting processor 455 and the data source 467 illustrated in FIG. 4 in the disclosure; and the first receiver 1303 includes the transmitter/receiver 456 (including antenna 460), the receiving processor 452 and the controller/processor 490 illustrated in FIG. 4 in the disclosure.

In Embodiment 13, the first transceiver 1301 transmits a first radio signal; the first transmitter 1302 transmits a second radio signal; and the first receiver 1303 receives a third radio signal.

In Embodiment 13, the first radio signal includes M1 first radio sub-signal(s), and a first sequence is used for generating the first radio sub-signal. The second radio signal includes M2 second radio sub-signal(s), and a first bit block is used for generating the second radio sub-signal. The M1 is a positive integer, the M2 is a positive integer in a target set, and each element in the target set is a positive integer. The target set is correlated with the M1. The third radio signal is used for at least one of determining whether the first bit block needs to be retransmitted, adjusting a transmission timing of the UE, or allocating resources for uplink transmission to the UE. M3 is used for determining time-domain resources occupied by the third radio signal, and the M3 is one element in the target set.

In one embodiment, the target set is composed of multiple elements.

In one embodiment, the M3 is a minimum value in the target set. A time length from an ending time of time-domain resources occupied by the third radio signal to a reference time is a second time interval, and the ending time of time-domain resources occupied by the third radio signal is behind the reference time. The reference time is behind the first time interval, a time length from the reference time to an ending time of the first time interval is M4 times of the reference time interval, and the M4 is a maximum value in the target set. The reference time interval, the second time interval and the first time interval are described in Embodiment 9.

In one embodiment, the M3 is a maximum value in the target set. A time length from an ending time of time-domain resources occupied by the third radio signal to a reference time is a second time interval, and the ending time of time-domain resources occupied by the third radio signal is behind the reference time. The reference time is behind the first time interval, a time length from the reference time to an ending time of the first time interval is M3 times of the reference time interval.

In one embodiment, a length of time-domain resources occupied by the third radio signal increases with the increase of the M3.

In one embodiment, an index of the first sequence in a candidate sequence set is used for determining a subcarrier spacing corresponding to subcarriers occupied by the second radio signal.

In one embodiment, the second-type resource subset occupied by the second radio signal is used for determining a subcarrier spacing corresponding to subcarriers occupied by the second radio signal.

Embodiment 14

Figure 14:
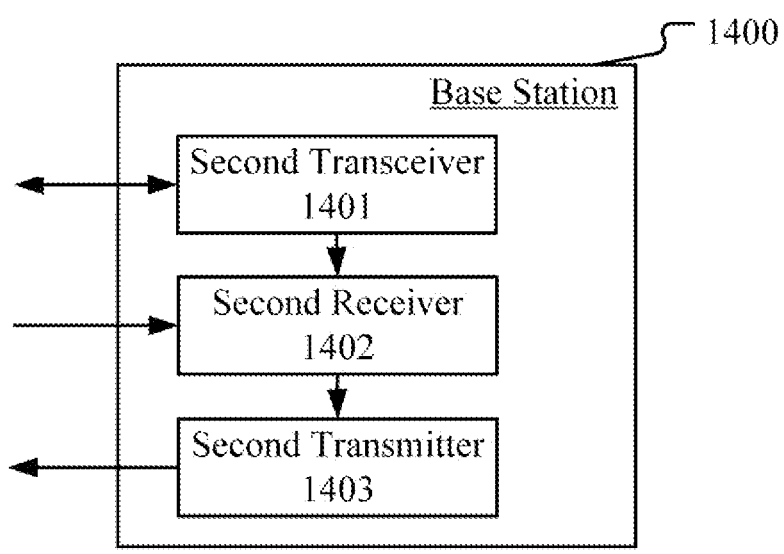
FIG. 14 is a structure block diagram illustrating a processing device in a base station according to one embodiment of the disclosure.

Embodiment 14 illustrates an example of a structure block diagram of a processing device in a base station, as shown in FIG. 14. In FIG. 14, the processing device 1400 in the base station includes a second transceiver 1401, a second receiver 1402 and a second transmitter 1403. The second transceiver 1401 includes the transmitter/receiver 416 (including antenna 420), the transmitting processor 415 and the controller/processor 440 illustrated in FIG. 4 in the disclosure; the second receiver 1402 includes the transmitter/receiver 416 (including antenna 420), the receiving processor 412 and the controller/processor 440 illustrated in FIG. 4 in the disclosure; and the second transmitter 1403 includes the transmitter/receiver 416 (including antenna 420), the transmitting processor 415 and the controller/processor 440 illustrated in FIG. 4 in the disclosure.

In Embodiment 14, the second transceiver 1401 receives a first radio signal; the second receiver 1402 receives a second radio signal; and the second transmitter 1403 transmits a third radio signal.

In Embodiment 14, the first radio signal includes M1 first radio sub-signal(s), and a first sequence is used for generating the first radio sub-signal. The second radio signal includes M2 second radio sub-signal(s), and a first bit block is used for generating the second radio sub-signal. The M1 is a positive integer, the M2 is a positive integer in a target set, and each element in the target set is a positive integer. The target set is correlated with at least one of the M1 or the first sequence. The third radio signal is used for at least one of determining whether the first bit block needs to be retransmitted, adjusting a transmission timing of a receiver of the third radio signal or allocating resources for uplink transmission to a receiver of the third radio signal. M3 is used for determining at least one of a starting time of time-domain resources occupied by the third radio signal or time-domain resources occupied by the third radio signal; and the M3 is one element in the target set.

In one embodiment, the first radio signal is transmitted on a PRACH.

In one embodiment, a transport channel corresponding to the second radio signal is an Uplink Shared Channel (UL-SCH).

In one embodiment, the second transceiver 1401 is further used for at least one of the following.

Transmitting a first signaling, wherein the first signaling is used for determining a first-type time-frequency resource set. The first-type time-frequency resource set includes P1 first-type resource subset(s). The first radio signal occupies one first-type resource subset. The P1 is a positive integer. The first-type resource subset occupied by the first radio signal is used for determining at least one of air-interface resources occupied by the second radio signal or the M1. The air-interface resources include at least the former one of time-frequency resources or code-domain resources. The first signaling is a higher-layer signaling.

Transmitting a second signaling, wherein the second signaling is used for determining a second-type time-frequency resource set. The second-type time-frequency resource set includes P2 second-type resource subset(s). Time-frequency resources occupied by the second radio signal belong to one second-type resource subset. The P2 is a positive integer. The second-type resource subset to which the time-frequency resources occupied by the second radio signal belong is used for determining a number of subcarriers occupied by the second radio signal. The second signaling is a higher-layer signaling.

Transmitting a fourth radio signal, wherein a measurement of the fourth radio signal is used for determining the M1.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the present disclosure include but not limited to mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the present application includes but not limited to macro-cellular base stations, micro-cellular base stations, home base stations, relay base station, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
    transmitting a first radio signal; and
    transmitting a second radio signal;
    wherein the first radio signal comprises M1 first radio sub-signal(s), and a first sequence is used for generating the first radio sub-signal; the second radio signal comprises M2 second radio sub-signal(s), and
    a first bit block is used for generating the second radio sub-signal; the M1 is a positive integer, the M2 is a positive integer in a target set, and each element in the target set is a positive integer; and the target set is correlated with at least one of the M1 or the first sequence; time-domain resources respectively occupied by any two of the M1 first radio sub-signals are orthogonal, time-domain resources respectively occupied by any two of the M2 second radio sub-signals are orthogonal; M1 is a positive integer number power of 2, or 1, M2 is a positive integer number power of 2, or 1, the first bit block is one Transmission Block (TB).

2. The method according to claim 1, further comprising:
    receiving a third radio signal;
    wherein the third radio signal is used for at least one of determining whether the first bit block needs to be retransmitted, adjusting a transmission timing of the UE or allocating resources for uplink transmission to the UE; M3 is used for determining at least one of a starting time of time-domain resources occupied by the third radio signal or time-domain resources occupied by the third radio signal; and the M3 is one element in the target set.

3. The method according to claim 2, wherein M3 is a maximum value in the target set, or M3 is a minimum value in the target set; the third radio signal includes DCI.

4. The method according to claim 1, further comprising:
    receiving a first signaling;
    wherein the first signaling is used for determining a first-type time-frequency resource set; the first-type time-frequency resource set comprises P1 first-type resource subset(s); the first radio signal occupies one first-type resource subset; the P1 is a positive integer; the first-type resource subset occupied by the first radio signal is used for determining at least one of air-interface resources occupied by the second radio signal or the M1; and the air-interface resources comprise time-frequency resources and/or code-domain resources.

5. The method according to claim 1, further comprising:
    receiving a second signaling;
    wherein the second signaling is used for determining a second-type time-frequency resource set; the second-type time-frequency resource set comprises P2 second-type resource subset(s); time-frequency resources occupied by the second radio signal belong to one second-type resource subset; the P2 is a positive integer; the second-type resource subset to which the time-frequency resources occupied by the second radio signal belong is used for determining a number of subcarriers occupied by the second radio signal.

6. The method according to claim 1, further comprising: receiving a fourth radio signal;
wherein a measurement of the fourth radio signal is used for determining the M1; the fourth radio signal includes at least one of a Primary Synchronization Signal (PSS) or a Secondary Synchronization Signal (SSS) or a Channel Status Information Reference Signal (CSI-RS).

7. The method according to claim 1, the first radio signal is transmitted on a Physical Random Access Channel (PRACH), the second radio signal is transmitted on a Physical Uplink Shared Channel (PUSCH); the transmission of the first radio signal is contention-based.

8. A UE for wireless communication, comprising:
a first transceiver, to transmit a first radio signal; and
a first transmitter, to transmit a second radio signal;
wherein the first radio signal comprises M1 first radio sub-signal(s), and a first sequence is used for generating the first radio sub-signal; the second radio signal comprises M2 second radio sub-signal(s), and a first bit block is used for generating the second radio sub-signal; the M1 is a positive integer, the M2 is a positive integer in a target set, and each element in the target set is a positive integer; and the target set is correlated with at least one of the M1 or the first sequence; time-domain resources respectively occupied by any two of the M1 first radio sub-signals are orthogonal, time-domain resources respectively occupied by any two of the M2 second radio sub-signals are orthogonal; M1 is a positive integer number power of 2, or 1, M2 is a positive integer number power of 2, or 1, the first bit block is one Transmission Block (TB).

9. The UE for wireless communication according to claim 8, further comprising:
a first receiver, to receive a third radio signal;
wherein the third radio signal is used for at least one of determining whether the first bit block needs to be retransmitted, adjusting a transmission timing of the UE or allocating resources for uplink transmission to the UE; M3 is used for determining at least one of a starting time of time-domain resources occupied by the third radio signal or time-domain resources occupied by the third radio signal; and the M3 is one element in the target set.

10. The UE according to claim 9, wherein M3 is a maximum value in the target set, or M3 is a minimum value in the target set; the third radio signal includes DCI.

11. The UE for wireless communication according to claim 8, wherein the first transceiver further receives a first signaling; wherein the first signaling is used for determining a first-type time-frequency resource set; the first-type time-frequency resource set comprises P1 first-type resource subset(s); the first radio signal occupies one first-type resource subset; the P1 is a positive integer; the first-type resource subset occupied by the first radio signal is used for determining at least one of air-interface resources occupied by the second radio signal or the M1; and the air-interface resources comprise time-frequency resources and/or code-domain resources.

12. The UE for wireless communication according to claim 8, wherein the first transceiver further receives a second signaling; wherein the second signaling is used for determining a second-type time-frequency resource set; the second-type time-frequency resource set comprises P2 second-type resource subset(s); time-frequency resources occupied by the second radio signal belong to one second-type resource subset; the P2 is a positive integer; the second-type resource subset to which the time-frequency resources occupied by the second radio signal belong is used for determining a number of subcarriers occupied by the second radio signal.

13. The UE for wireless communication according to claim 8, the first transceiver further receives a fourth radio signal, wherein a measurement of the fourth radio signal is used for determining the M1; the fourth radio signal includes at least one of a Primary Synchronization Signal (PSS) or a Secondary Synchronization Signal (SSS) or a Channel Status Information Reference Signal (CSI-RS).

14. The UE for wireless communication according to claim 8, the first radio signal is transmitted on a Physical Random Access Channel (PRACH), the second radio signal is transmitted on a Physical Uplink Shared Channel (PUSCH); the transmission of the first radio signal is contention-based.

15. A base station for wireless communication, comprising:
a second transceiver, to receive a first radio signal; and
a second receiver, to receive a second radio signal;
wherein the first radio signal comprises M1 first radio sub-signal(s), and a first sequence is used for generating the first radio sub-signal; the second radio signal comprises M2 second radio sub-signal(s), and a first bit block is used for generating the second radio sub-signal; the M1 is a positive integer, the M2 is a positive integer in a target set, and each element in the target set is a positive integer; and the target set is correlated with at least one of the M1 or the first sequence; time-domain resources respectively occupied by any two of the M1 first radio sub-signals are orthogonal, time-domain resources respectively occupied by any two of the M2 second radio sub-signals are orthogonal; M1 is a positive integer number power of 2, or 1, M2 is a positive integer number power of 2, or 1, the first bit block is one Transmission Block (TB).

16. The base station for wireless communication according to claim 15, further comprising:
a second transmitter, to transmit a third radio signal;
wherein the third radio signal is used for at least one of determining whether the first bit block needs to be retransmitted, adjusting a transmission timing of a receiver of the third radio signal or allocating resources for uplink transmission to a receiver of the third radio signal; M3 is used for determining at least one of a starting time of time-domain resources occupied by the third radio signal or time-domain resources occupied by the third radio signal; and the M3 is one element in the target set.

17. The base station for wireless communication according to claim 15, wherein M3 is a maximum value in the target set, or M3 is a minimum value in the target set; the third radio signal includes DCI.

18. The base station for wireless communication according to claim 15, wherein the second transceiver further transmits a first signaling; wherein the first signaling is used for determining a first-type time-frequency resource set; the first-type time-frequency resource set comprises P1 first-type resource subset(s); the first radio signal occupies one first-type resource subset; the P1 is a positive integer; the first-type resource subset occupied by the first radio signal is used for determining at least one of air-interface resources occupied by the second radio signal or the M1; and the air-interface resources comprise at least the time frequency resources of time-frequency resources and/or code-domain resources.

19. The base station for wireless communication according to claim 15, wherein the second transceiver further transmits a fourth radio signal, wherein a measurement of the fourth radio signal is used for determining the M1; the fourth radio signal includes at least one of a Primary Synchronization Signal (PSS) or a Secondary Synchronization Signal (SSS) or a Channel Status Information Reference Signal (CSI-RS).

20. The base station for wireless communication according to claim 15, the first radio signal is transmitted on a Physical Random Access Channel (PRACH), the second radio signal is transmitted on a Physical Uplink Shared Channel (PUSCH); the transmission of the first radio signal is contention-based.

\* \* \* \* \*